United States Patent [19]

Meier et al.

[11] 3,988,742

[45] Oct. 26, 1976

[54] RECORDER USING LIGHT EMITTING DIODES

[75] Inventors: Michael J. Meier, Monrovia; Richard M. Malueg, Glendora, both of Calif.

[73] Assignee: McDonnell Douglas Corporation, Long Beach, Calif.

[22] Filed: Apr. 28, 1975

[21] Appl. No.: 572,306

[52] U.S. Cl. .......................... 346/107 R; 178/6.7 R; 340/173 LM; 346/1
[51] Int. Cl.² ............................................. G01D 9/42
[58] Field of Search ............... 346/107 R, 108, 1; 178/6.7 R, 6.6 R, 15; 340/173 LM

[56] References Cited
UNITED STATES PATENTS

| | | |
|---|---|---|
| 3,072,889 | 1/1963 | Willcox ...................... 346/107 R X |
| 3,389,403 | 6/1968 | Cottingham et al. ................ 346/108 |
| 3,438,057 | 4/1969 | Neitzel ............................ 346/107 R |
| 3,761,917 | 9/1973 | Brown et al. ...................... 178/15 X |
| 3,781,783 | 12/1973 | Tucker ............................ 346/108 X |
| 3,832,488 | 8/1974 | Fahey ................................... 178/15 |
| 3,850,517 | 11/1974 | Stephany et al. ..................... 354/12 |

*Primary Examiner*—Joseph W. Hartary
*Attorney, Agent, or Firm*—Kleinberg, Morganstern, Scholnick & Mann

[57] ABSTRACT

Light emitting diodes are optically coupled to a photosensitive material through fiber optics. Incoming data are used to determine the emission of the diodes so that the incoming information is printed and stored as shades of grey. Tone and contrast control are provided, and either positives or negatives may be printed. Very high speed operation, on the order of gigabits per second, is currently feasible.

83 Claims, 7 Drawing Figures

TIMING PULSES GENERATED BY EXPOSURE CONTROL UNIT

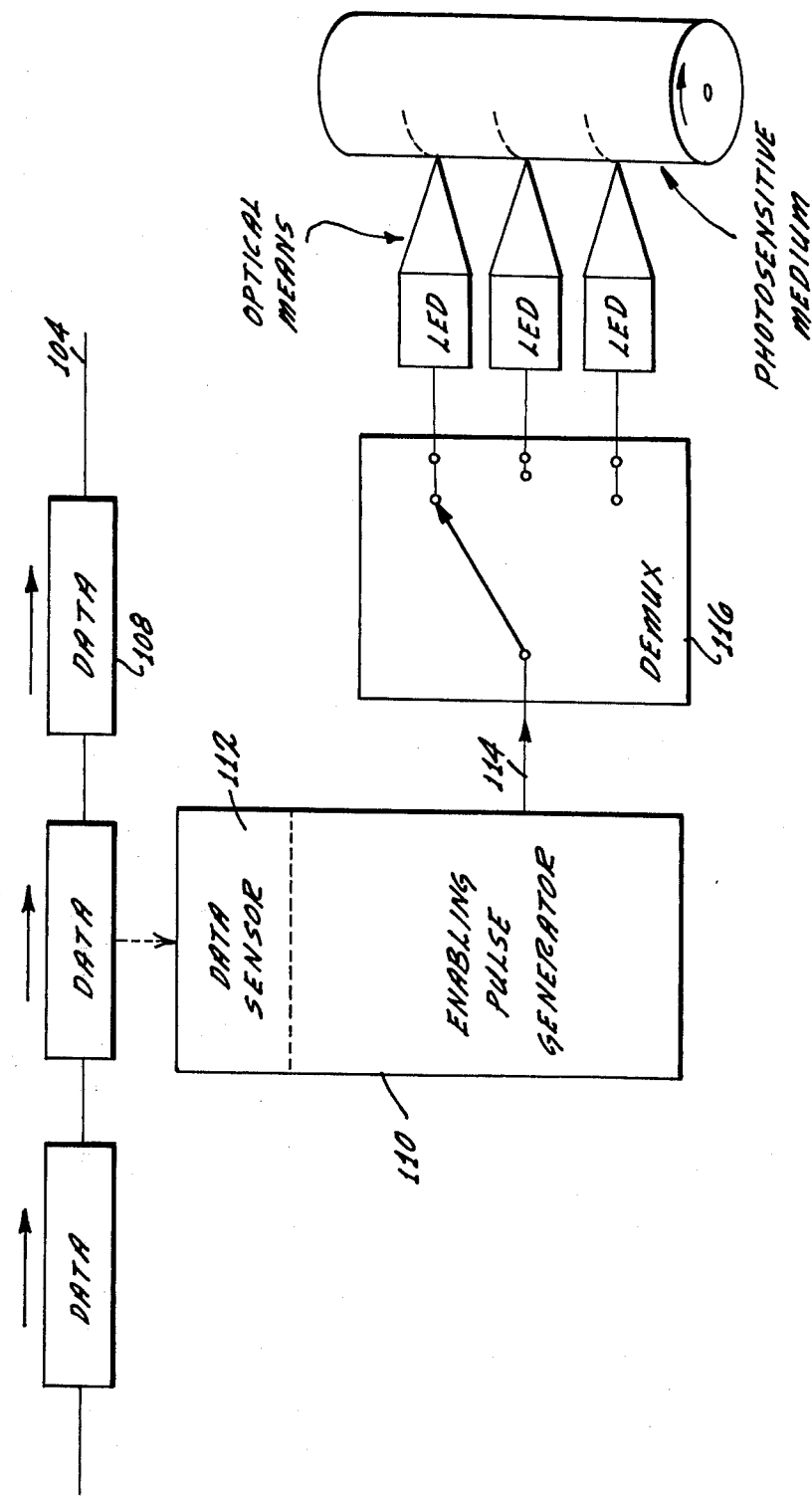

RECORDER USING LIGHT EMITTING DIODES

BACKGROUND OF THE INVENTION

The present invention relates to the field of data recorders or printers. Because the present invention can be used in many ways, it might also be regarded as being in the field of demultiplexers, facsimile printers, computers, or telemetering equipment.

The idea of using an array of controlled light sources to record information upon a moving film is not new. The present invention provides orders of magnitude improvement over the prior art both in the speed with which the data can be recorded and in the density with which the data is recorded upon the film.

SUMMARY

The present invention in its most general form can be used with data having a wide variety of formats. It is assumed that the data is presented to the system of the present invention in data groups consisting of several elements or characters assoiacted together according to some system. A data group could consist of a binary number made up of a series of 1's and 0's. Alternatively, a data group could consist of a set of words made up of a series of letters.

The data may or may not carry with it address information for determining the location on the film at which the data is to be stored. If the incoming data is accompanied by an address, the data is routed to the appropriate channel of the printer.

The present invention permits the data to be stored on a photographic film in the form of predetermined regions having variations in their density, that is to say, the data is represented by shades of grey. Although the number of shades of grey used will depend on the application, that number is usually greater than two shades, and is limited only by the "noise" of the recording material.

The source of light used is a light emitting diode. The exposure may be varied either by adjusting the brightness of the light emitting diode or by adjusting the exposure time or both. The light emitted by the diode can be conducted to the film through a fiber optic bundle.

It is an object of the present invention to provide a printer for data in which a wide latitude of contrast and tone control is possible. That is, the density levels may be chosen in advance to achieve the effect of linearizing the density curve of the film if desired.

It is a further object of the present invention to provide a printer in which either positives or negatives may be printed as desired.

Another object of the present invention is to provide a printer for demultiplexing data at data rates on the order of gigabits per second and to provide a density of information stored on the film comparable to that density obtained with photographic or imaging systems.

DESCRIPTION OF THE DRAWINGS

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 2 is a block diagram of the exposure control circuit.

FIG. 7 is a schematic block diagram of a more general alternative embodiment of the invention.

DESCRIPTION OF THE PREFERRED EMBODIMENT

The embodiment about to be described is limited to use with a specific type or format of incoming data, namely data binary groups consisting of a fixed number of 1's and 0's, these characters being presented to the embodiment in parallel on separate wires, and the binary groups arriving in succession. An address may or may not be associated with each binary group.

Figure 1:
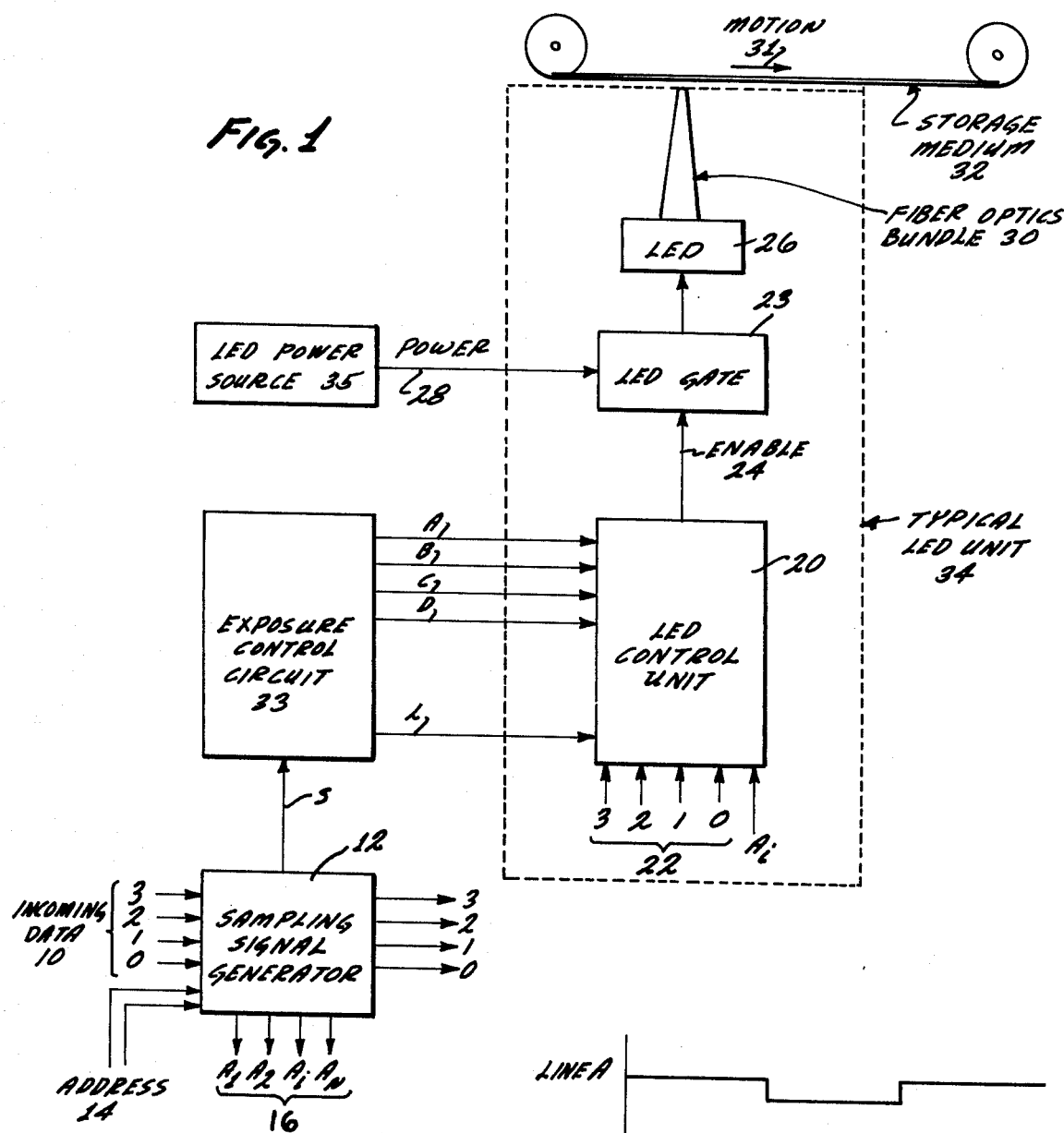
FIG. 1 is a schematic diagram of a preferred embodiment of the LED printer system.

As shown in FIG. 1, the incoming data 10 first passes through a sampling signal generator 12. The purpose of this sampling signal generator is two-fold. First, it generates a pulse signal S which indicates that data has been received, and secondly, it sends an addressing pulse over one of the lines $A_1$ to $A_N$, 16, to indicate which LED unit is to print the data. If the incoming data is accompanied by an address 14, that address would determine which LED unit to use. If the incoming data in a particular application does not contain an address, the sampling signal generator could be programmed to route successive incoming words to successive LED units in a predetermined cyclical or psuedorandom sequence.

A typical LED unit 34, as shown in FIG. 1 consists of an LED control unit 20 which operates upon the incoming signal to produce an Enable signal 24 for determining the interval during which the LED 26 is to emit light, an LED gate 23 in which the Enable signal 24 turns on the power 28 to the LED 26 and bundle 30 of fiber optics to convey the light output of the LED to the light sensitive storage medium 32 on which the information is to be recorded. The fiber optic bundle 30 may be tapered or untapered, and coherent or incoherent.

A typical recording head would contain a number of these typical LED units 34 having their fiber optic elements 30 arranged in a linear array in a direction transverse to the direction of motionn 31 of the film or other light sensitive medium. The LED printer system, in addition to the recording head, includes the sampling signal generator 12, an exposure control circuit 33 and an LED power source 35. These elements are connected as shown by the letters and numbers in FIG. 1. The numbers on certain input and output lines in FIG. 1 refer to the power of two represented by that particular digit place in the binary number. For example line three is the line containing a 1 or 0 which occupies the $2^3$ position in the binary number.

Because the data is recorded in terms of shades of grey corresponding to the discrete leves of magnitude indicated by the binary number in the incoming data, it is necessary to provide means for determining how much exposure should be allocated to each binary digit. For most applications a monotonic scale is desired, so that each successively larger binary incoming number is represented by a successively more dense track on the film.

One technique for determining the exposure corresponding to each binary digit is shown in the preferred embodiment of FIG. 2. In this embodiment it is the exposure time rather than the brightness or illumination that is varied to produce a particular shade of grey. The input word is chosen to represent the shade of grey. Thus the input data is minimized and may be recorded on a mulitplicity of materials. Upon receipt of a word of data, a signal is generated by the sampling signal generator which starts the clock, 36, shown in FIG. 2. The clock generates a sequence of equally spaced pulses 38 which are in turn counted by the counter, 40. When the count has reached a particular number, A, as recognized by comparator A, 42, which may be part of a read-only memory, the comparator emits a pulse to a binary counter 44 through an OR gate 46. Assuming the counter to be initially in the 00 state, receipt of the pulse from comparator A causes the binary counter to advance to the 01 state.

Figure 3:
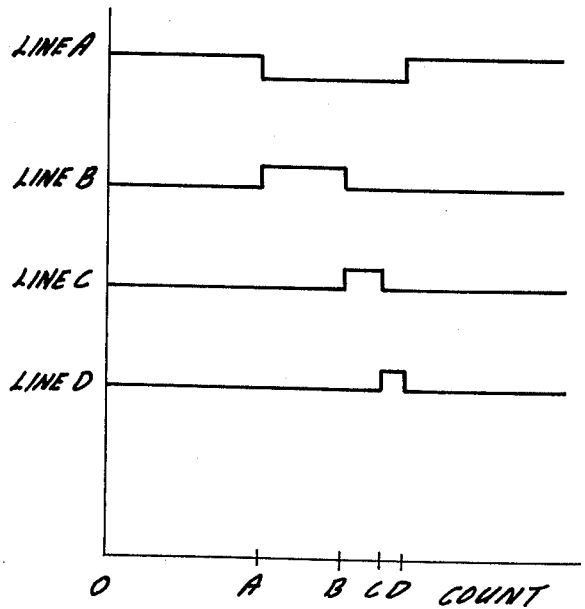
FIG. 3 shows the timing pulses generated by the exposure control unit.

Similarly, the binary counter changes from the 01 state to the 10 state upon receipt of the pulse from comparator B, 43, then changes from the 10 to the 11 state upon reciept of the pulse from comparator C, 45, and finally recycles to the 00 state upon receipt of the pulse from comparator D, 47. It should be noted that the binary counter can be in only one state at one time, and that the transition from one state to another state is substantially instantaneous. Therefore, the outputs from the binary counter appear as shown in FIG. 3. It can be seen that the exposure control circuit generates on separate lines a set of pulses not overlapping in time, for determining the exposure time assigned to each binary digit of the incoming data. A clock which divides time linearly may thus be transformed into a clock which divides time nonlinearly and thus allows automatic gamma compensation.

If, for example, it were desired that the exposure times should be exactly proporational to the magnitude represented by the binary number, then A would equal 8, B would equal 12, C would equal 14, and D would equal 15. When the count on the counter has reached D-1, here 13, a signal is applied to an "AND" gate 48 to stop the clock on the next pulse and simultaneously to clear the latch as will be described below. Thus, when the clock has reached a cound of D, the binary counter 44 recycles to the 00 state, the clock is stopped, and the counter 40 is reset to 0.

Figure 4:
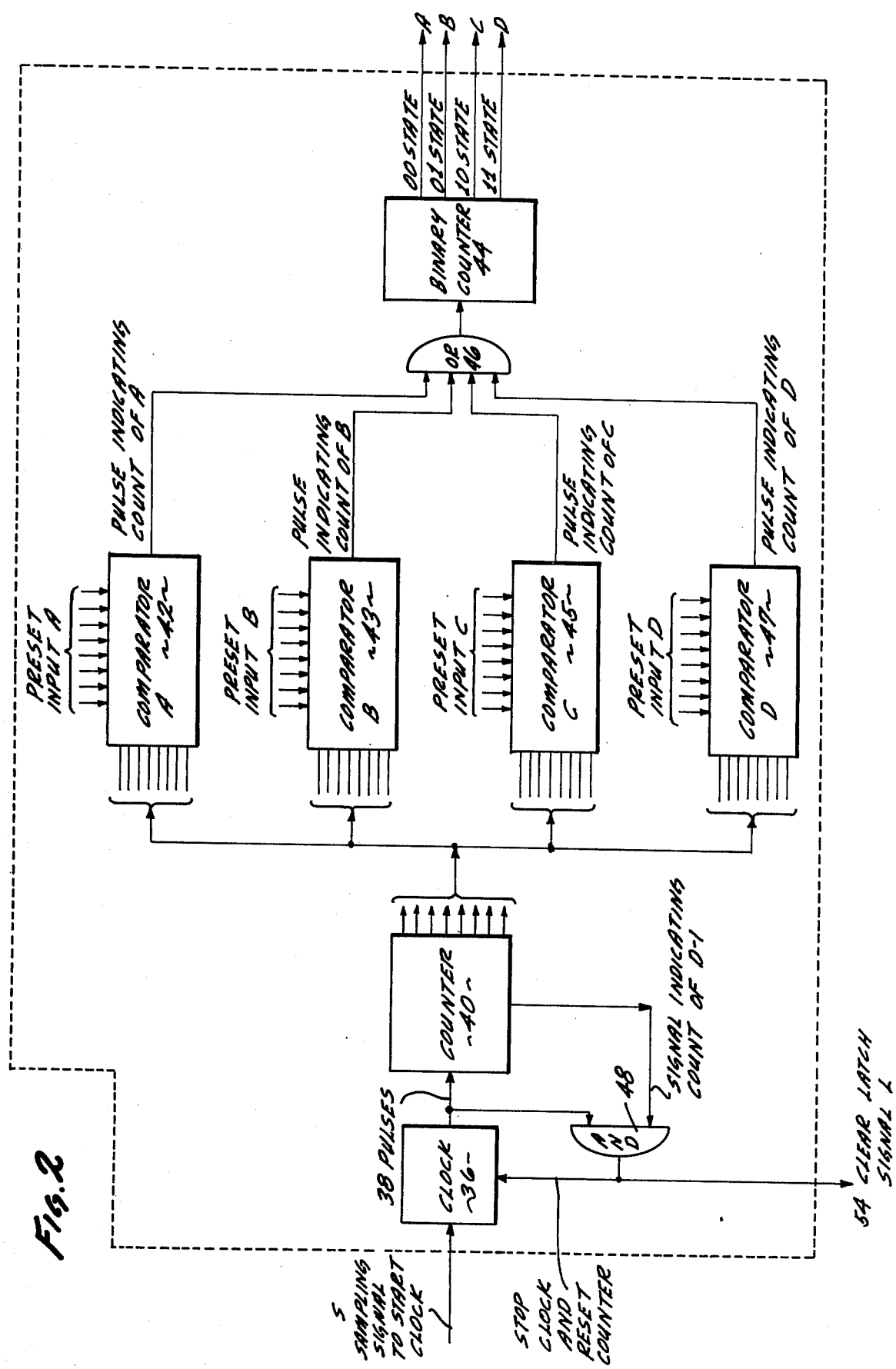
FIG. 4 shows the LED control unit.

As shownn in FIG. 4, the timing signals from the exposure control circuit are applied to enable the LED to emit light for the duration of a particular timing signal only if there is a 1 in the corresponding binary digit position. As shown in FIG. 4, this is accomplished by the use of "AND" gates such as 50, each having its inputs one of the lines from the exposure control circuit and one of the binary digit positions of the incoming data signal. Because the incoming data may be a continuous signal which is sampled at specific times, it is desirable to incorporate into the LED control unit a latching circuit 52 which retains the binary digits of the incoming data signal at a particular instant and preserves them during the exposure process and until the latch is cleared by receipt of a signal L, 54, generated by the exposure control circuit. Alternately, the LED itself may perform the latching function if fabricated as a PNPN device.

If there is a 1 in the $2^3$ position in the incoming data word, the LED will be enabled from the time 0 until such time as the counter reaches a count of A. Immediately thereafter line B is activated if there is a 1 at the $2^2$ position in the binary input number, the LED will enabled while the count increases from A to B. Immediately upon the count reaching B, line C is activated and if there is an 0 in the second or $2^1$ place of the incoming binary number, the LED will not be activated during the time it takes the counter to count from B to C. Finally, if there is a 1 at the $2^0$ position of the binary number, the LED will be enabled during the time it takes the counter 40 to count from C to D.

Although in the present example only four levels A, B, C and D were used, it is obvious that in theory any number of levels could be used. The precision with which these levels can be preset is limited only by the duration of one count of the clock 40. Thus, once chosen, the numbers A, B, C, and D can be implemented with considerable precision. The choice of the numbers A, B, C, and D depends on the exposure it is desired to associate with each successive binary digit. By suitable choice of the numbers A, B, C and D, non-linearities in the curve of film density versus exposure time can be compensated if desired, by spacing the numbers A, B, C, and D closer together where the curve is rising most steeply and spreading them apart where the curve is more shallow.

Another variation on the preferred embodiment is as follows: the sequence of pulses on lines A, B, C and D is regarded merely as one cycle in a repetitive sequence of similar cycles and instead of stopping the counter 40 at the end of the first cycle, the counter is permitted to continue counting until it reaches some integer multiple of D. This technique has the advantage of producing a more nearly uniform density on the film but has the disadvantage of requiring the LED to respond to shorter pulses.

It is readily apparent that if the numbers, B, C, and D are chosen to lie close to the number A, the printed record will have rather low lone contrast, but if the numbers B, C, and D are widely separated from A and from each other, the printed tones likewise will be well separated.

Likewise it can be seen that negatives rather than positives may be printed if instead of printing the incoming data, each binary digit is replaced by its complement. That is to say, each 1 is replaced by a 0 and each 0 is replaced by a 1. This step would be carried out before the incoming data is latched into the LED control unit; quite possible, provision for this negative-printing feature could be contained in the sampling signal generator 12. Since the gamma control feature is variable, it may contain the correction factors for a total sensor display system of which this printer is only a subsystem. Correction for responsivity variations within both sensor system elements and printer system elements may be performed by the printing process.

Figure 5:
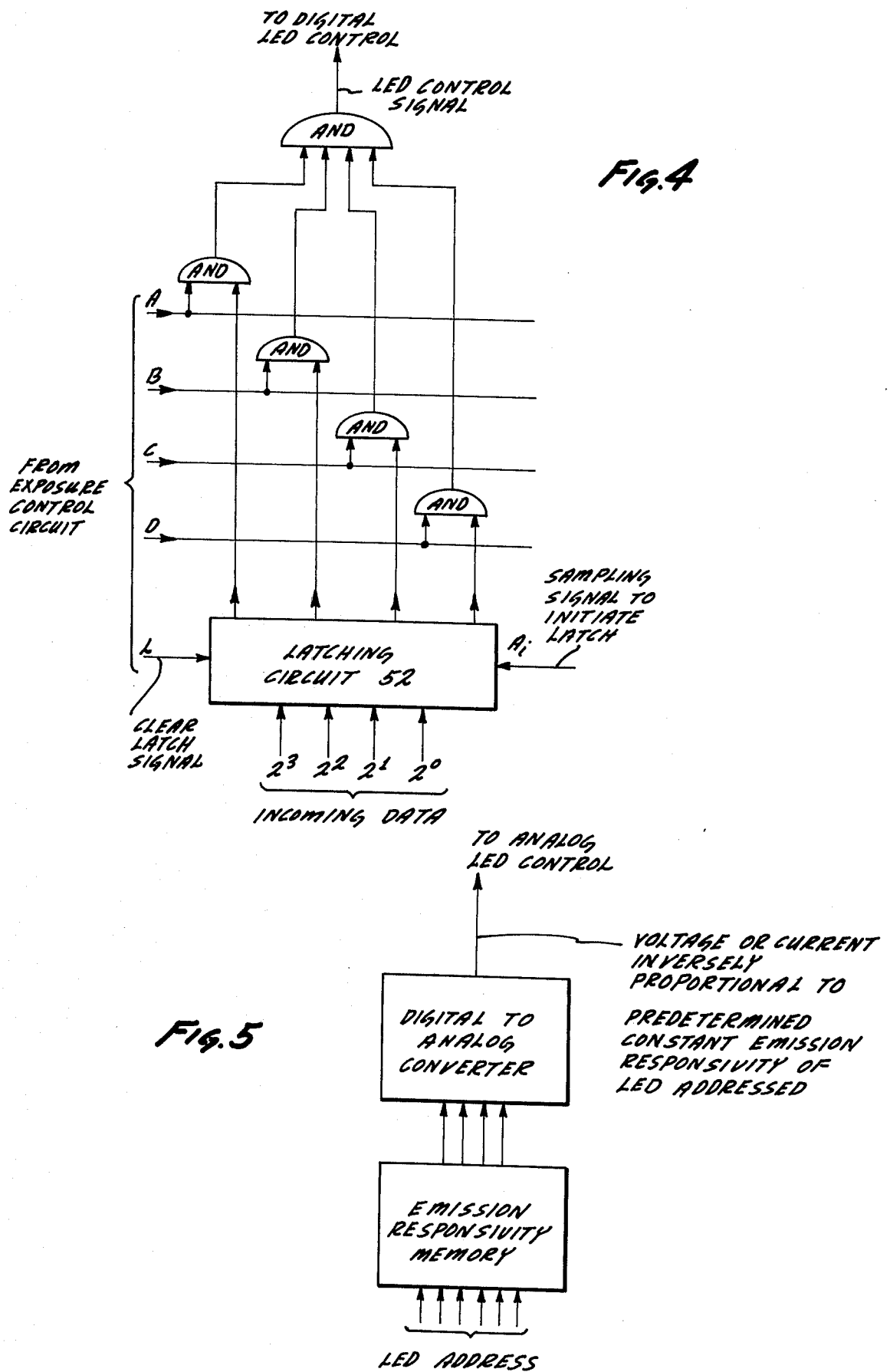
FIG. 5 shows a technique for compensating for variations in LED emission responsivity and transmissivity.

The variations in the brightness of the individual light emitting diodes, as manufactured, can be corrected by determining the driving current for each diode in inverse proportion to its emission responsivity, as shown in FIG. 5.

Likewise, the numbers A, B, C and D can be chosen in such a way as to increase or decrease the overall density of the printed record simply by choosing the numbers sufficiently large or small, respectively.

Because the frequency response of light emitting diodes is measured in megacycles per second and because many thousand LED's could be used in a single array to write data onto a moving film in a line printer mode, it is apparent that the present invention provides a printing demultiplexer with a data-handling capacity measured in gigabits per second.

The embodiment described above was limited to a specific format of incoming data, namely binary groups consisting of a fixed number of 1's and 0's. In this section, an alternative embodiment will be described which can be used with a wider variety of data formats. For example, the incoming data may be in some other characters such as alphabetic letters, or symbols of some other type.

The data could in fact be in analogue form, such as pulse width modulations, frequency modulation or pulse spacing modulation. The important thing is that each group of data must have some identifying configuration from which the information it conveys can be extracted. The embodiment to be described does not, of course, concern itself with the significance attached to the information encoded in the incoming data. The embodiment is instead concerned merely with printing that which is presented to it, and for that purpose the embodiment need only concern it with the configurations of the data group presented to it, rather than their significance.

Figure 6:
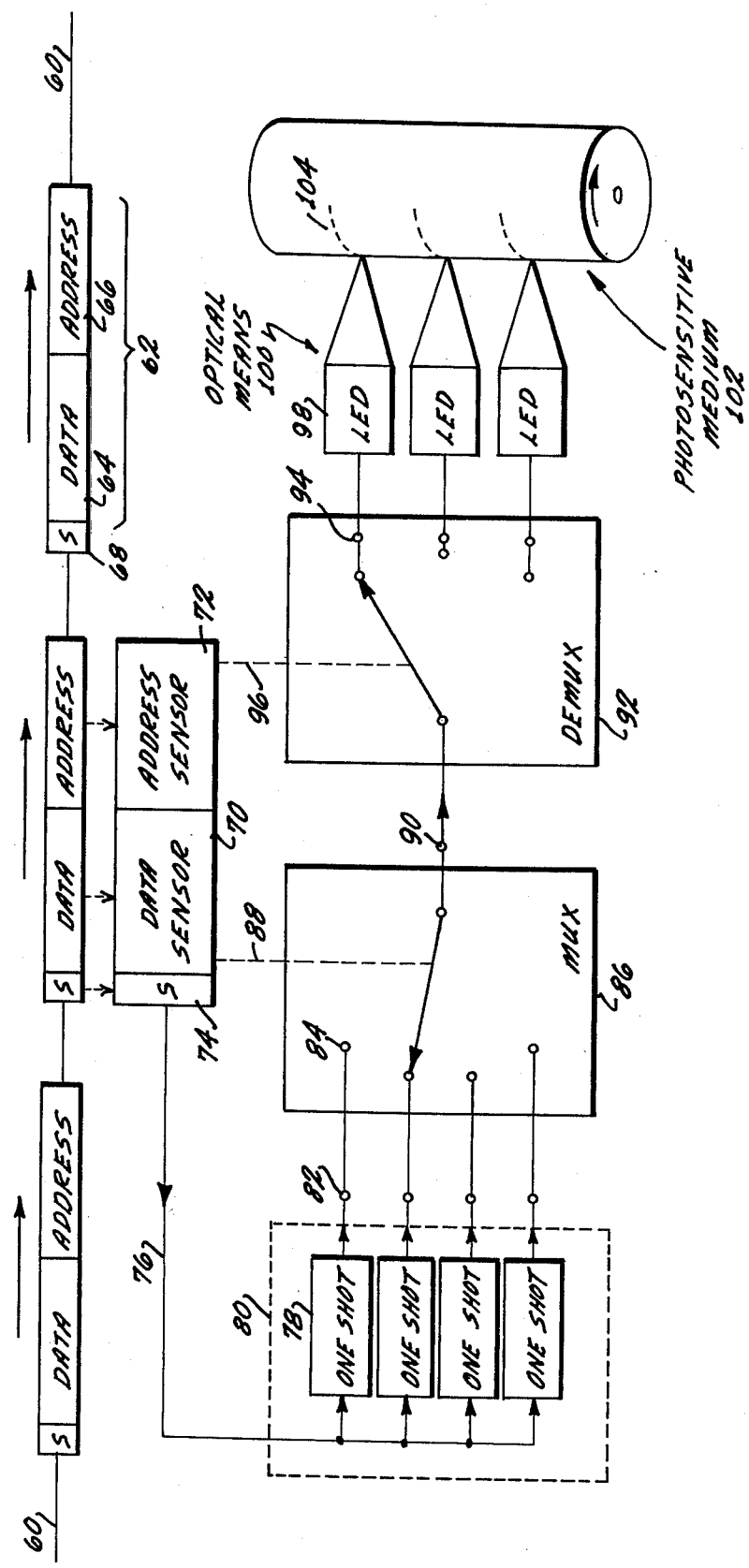
FIG. 6 is a schematic block diagram of an alternative embodiment of the invention.

FIG. 6 is a schematic block diagram illustrating the discussion of the alternative embodiment. The incoming data is assumed to arrive via some channel 60, which may be a radio broadcast channel or a conductor, or other means for transmitting the data. Each successive incoming coded data group, of which 64 is typical, may be accompanied by an address 66 and a signal 68 indicating completion of the transmission of the data. This signal plus the data plus the address together constitute a typical incoming parcel of information, 62. If there were no signal indicating completion of the data group, one could be generated by other means such as a clock which indicates completion if no further data is received within a predetermined time interval from the most recently received data.

The incoming data parcels, of which 62 is typical, are sensed by sensing means of the printer, shown in FIG. 6, as including a data sensor 70, and address sensor 72 if required, and a timing signal sensor 74 if applicable. If the incoming data parcel contains no timing signal, one is assumed to be generated by the data sensor unit 70.

The timing signal, 76, is used to trigger a number of one-shot multivibrators, of which 78 is typical, and which collectively make up the Enable signal generator 80. The one-shot multivibrators of which 78 is typical respond simultaneously to the timing signal 76 by each generating a pulse having a different duration. The pulses all start at the same instant of time, but they terminate at different times. The purpose of these one-shot multivibrators is to generate a set of pulses having distinct durations. The duration of these pulses determines the exposure of the light emitting diode and consequently the shade of grey to be printed on the photosensitive medium. Complete flexibility is available at this stage to predetermine the pulse durations of the one-shot multivibrators in such a way as to achieve whatever contrast and tone control may be desired in the printed photosensitive medium.

The number of one-shot multivibrators also permits a latitude of design flexibility. Normally, one would wish to have a separate one-shot multivibrator corresponding to each distinct incoming coded data groups configuration. However, in specialized applications it may be desirable to indicate only that the incoming data falls into one of the number of classes or ranges, and in that case there would be a separate one-shot multivibrator for each of the classes or ranges.

The enabling pulses generated by the one-shot multivibrators are presented on separate terminals of the Enable signal generator 80, of which 82 is a typical output terminal. These terminals are connected to the input terminals of which 84 is typical of the multiplexer 86. That multiplexer may be thought of as a single pole multithrow electrical switch, whose position is determined by the configuration of the sensed data group, as indicated by dashed line 88. The purpose of the multiplexer is to select only one of the possible enabling pulses and to present the selected enabling pulse at the output terminal 90 of the multiplexer 86.

The output terminal of the multiplexer is connected to the input terminal of a demultiplexer 92 which directs the selected enabling pulse to one of a number of output terminals of which 94 is typical determined by the address sensed by address sensor 72, as indicated by dashed line 96. The purpose of the demultiplexer is to determine which light emitting diode the selected enable pulse will be applied to. If the incoming data package includes no address, the address sensor 72 is superfluous, and other means must be found to determine which light emitting diode is to respond to the selected enabling pulse. Such other means might include simply stepping the demuliplexer from one output line to another in a predetermined cyclicle sequence, or in a pseudo-random sequence, in which case the means for stepping the demultiplexer 92 would be contained within the demultiplexer, normally.

Each of the output terminals of the demultiplexer 92 of which 94 is typical, is connected to at least one light emitting diode of which 98 is typical. It is understood that the circuit 98 includes not only the diode itself but also the power supply for the unit, gating means so that the power can be applied to the light emitting diode in response to the selected enabling pulse, and may further include means for normalizing the shades of grey printed on the photosensitive medium by each channel comprising the LED circuit and optical means 100.

Optical means 100 collects the light emitted by each light emitting diode and forms it into a small spot, typically less than 25 micrometers in diameter on the photosensitive medium 102. Optical means 100 may typically consist of lenses, or at least one fiber optics bundle which may be coherent or incoherent. Normally, the photosensitive medium 102 would be moving relative to the spots of light formed by optical means 100 resulting in the data being recorded along tracks of which 104 is typical.

Thus has been shown an alternative embodiment in which a multiplexer responds to the configuration of an incoming data group by selecting an enabling pulse whose duration bears some relation to the configuration of the incoming data group, and in which a selected enabling pulse is directed to the appropriate light emitting diode channel by a demultiplexer which may be responsive to the address accompanying the incoming data group. The main advantage of this alternative embodiment is its ability to operate on data having either binary or nonbinary formats.

FIG. 7 represents a fairly general embodiment of the presentn invention, showing only those elements deemed to be most essential for a practical system. In the system of FIG. 7, the incoming data is assumed to have a format consisting of recognizeable groups of characters. Item 108 is a typical data group. The data groups arrive via some channel, shown symbolically here as 104. That channel may be radio, optical, electrical, or mechanical. It is not inconceivable that the data groups 108 could be items moving along an assembly line, freight cars moving along a railroad track, or even human beings moving past a particular point.

Regardless of the nature of the channel 104, the successive data groups carry information in the form of the configuration of their characteristics or characters. The configuration of these characters is sensed by a part of the enabling pulse generator 110 referred to in FIG. 7 as the data sensor 112. In the system of FIG. 7 the enabling pulse generator produces a single pulse for each data group, the duration of that pulse being determined by the configuration of the characters comprising the data group. Thus, the enabling pulse generator 110 may be thought of as a transducer which converts the characteristics of the data group to a pulse width coded form.

The enabling pulses are conducted by conductor 114 to the input of a demultiplexer 116. Demultiplexer 116 routes or directs these incoming enabling pulses to appropriate channels of the printer. Self-contained means may be used to direct the incoming enabling pulse to the appropriate channel or alternatively the direction may be in response to an address sensed by an address sensor which could be a part of demultiplexer 116, although that is not shown in FIG. 7.

The remainder of the system shown in FIG. 7 is identical in structure and in function to the system shown in FIG. 6 above.

Thus, there has been shown a more general embodiment of the present invention in which an enabling pulse generator responds to the configuration of incoming data groups to provide an enabling pulse whose duration bears some predetermined relationship to the configuration of the incoming data group. These enabling pulses are then routed to the appropriate channel of the printer by a demultiplexer which may be stepped in a predetermined cyclical sequence, or in a pseudo-random sequence, or in response to an address accompanying each data group.

The foregoing detailed descriptions are illustrative of several embodiments of the invention, and it is to be understood that additional embodiment thereof will be obvious to those skilled in the art. The embodiments described herein together with those additional embodiments are considered to be within the scope of the invention.

What is claimed is:

1. Apparatus for printing as predetermined shades on a photosensitive material, the information conveyed by successive incoming coded data groups having various configurations, comprising:
    a. enabling pulse generating means for sensing the configuration of each successive data group and for generating in response thereto an enabling pulse having duration in some predetermined relationship to the configuration of the incoming coded data group,
    b. demultiplexing means electrically connected to said enabling pulse generating means and having at least one output terminal, for directing successive enabling pulses to the output terminals of said demultiplexing means in a predetermined sequence,
    c. a light emitting diode connected to each output terminal of said demultiplexing means for generating light in relation to the duration of the enabling pulse, and
    d. optical means for transferring the light generated by the light emitting diode to the photosensitive material.

2. The apparatus of claim 1 wherein said demultiplexing means has more than one output terminal, and further including electrical normalization means by which the variation in emission responsivity among said light emitting diodes as well as the transmission variation in said optical means is automatically compensated to produce recorded data of uniform quality.

3. The apparatus of claim 1 wherein said light emitting diode is capable of responding to said enable pulses at frequencies greater than one megahertz, whereby the information conveyed by the coded data groups may be recorded on the photosensitive material at very fast rates.

4. The apparatus of claim 1 wherein said optical means further comprise reducing optical means for transferring light generated by said light emitting diode to a region on the photosensitive material having dimensions of any size desired, typically smaller than 25 micrometers in dimension, whereby the coded data groups may be recorded compactly on the film.

5. The apparatus of claim 1 wherein said optical means further comprise a coherent fiber optics bundle.

6. The apparatus of claim 1 wherein said optical means further comprise a bundle of tapered fiber optics.

7. The apparatus of claim 1 wherein said optical means further comprise an incoherent fiber optics bundle of known distortion, whereby the light generated by the light emitting diode is transferred to predetermined coded regions.

8. The apparatus of claim 1 wherein said demultiplexing means directs successive enabling pulses to the output terminals of said demultiplexing means in a cyclical sequence.

9. The apparatus of claim 1 wherein said demultiplexing means include means for directing successive enabling pulses to the output terminals of said demultiplexing means in a pseudo-random sequence, whereby the data groups are encoded spatially.

10. The apparatus of claim 1 wherein said enabling pulse generating means further comprises preset memory means for establishing the relationship between the duration of the enabling pulse and the configuration of the incoming coded data group.

11. The apparatus of claim 10 wherein said memory means is a nonvolatile memory.

12. The apparatus of claim 10 wherein said memory means is an alterable memory, whereby the relationship between the duration of the enabling pulse and the configuration of the incoming coded data group can be changed.

13. Apparatus for printing as predetermined shades on a photosensitive material, the information conveyed by successive incoming coded data groups having various configurations where each data group is accompanied by an address, comprising:

a. enabling pulse generating means for sensing the configuration of each successive data group and for generating in response thereto an enabling pulse having duration in some predetermined relationship to the configuration of the incoming data group, b. demultiplexing means electrically connected to said enabling pulse generating means and having at least one output terminal, for sensing the address accompanying each successive data group and for directing successive enabling pulses to the output terminal of said demultiplexing means as determined by the address accompanying the corresponding data group, c. a light emitting diode connected to each output terminal of said demultiplexing means for generating light in relation to the duration of the enabling pulse, and d. optical means for transferring the light generated by the light emitting diode to the photosensitive material.

14. The apparatus of claim 13 wherein said demultiplexing means has more than one output terminal, and further including electrical normalization means by which the variation in emission responsivity among said light emitting diodes as well as the transmission variation in said optical means is automatically compensated to produce recorded data of uniform quality.

15. The apparatus of claim 13 wherein said light emitting diode is capable of responding to said enable pulses at frequencies greater than one megahertz, whereby the information conveyed by the coded data groups may be recorded on the photo-sensitive material at very fast rates.

16. The apparatus of claim 13 wherein said optical means further comprise reducing optical means for transferring light generated by said light emitting diode to a region on the photosensitive material having dimensions of any size desired, typically smaller than 25 micrometers in dimension, whereby the coded data groups may be recorded compactly on the film.

17. The apparatus of claim 13 wherein said optical means further comprise a coherent fiber optics bundle.

18. The appartus of claim 13 wherein said optical means further comprises a bundle of tapered fiber optics.

19. The apparatus of claim 13 wherein said optical means further comprise an incoherent fiber optics bundle of known distortion, whereby the light generated by the light emitting diode is transferred to predetermined coded region of the photosensitive material.

20. The apparatus of claim 13 wherein said enabling pulse generating means further comprises preset memory means for establishing the relationship between the duration of the enabling pulse and the configuration of the incoming coded data group.

21. The apparatus of claim 20 wherein said memory means is a nonvolatile memory.

22. The apparatus of claim 20 wherein said memory means is an alterable memory, whereby the relationship between the duration of the enabling pulse and the configuration of the incoming coded data group can be changed.

23. Apparatus for printing as predetermined shades on a photosensitive material the information conveyed by successive incoming coded data groups comprising:

a. means for sensing the arrival of a complete incoming coded data group and for generating as an output a timing signal in response thereto, b. enabling pulse generating means for generating a set of enabling pulses at separate output terminals, initiated simultaneously in response to the timing signal, the durations of the enabling pulses of the set representing all possible incoming coded data group configurations, whereby for each possible configuration of incoming coded data group there corresponds an output terminal at which an enabling pulse is presented, whose duration corresponds to the data group, c. multiplexing means for connecting that output terminal of said enabling pulse generating means which corresponds to a particular coded data group configuration to the output terminal of said multiplexing means, d. demltiplexing means connected to the output terminal of said multiplexing means and having at least one output terminal for routing each successive enabling pulse selected by said demultiplexing means to one of the output terminals of said demultiplexing means in a predetermined sequence, e. at least one light emitting diode connected to each output terminal of said demultiplexing means for generating light in relation to the durations of successive enabling pulses, and f. optical means for transferring the light generated by the light emitting diode to the photosensitive material.

24. Apparatus of claim 23 wherein said demultiplexing means has more than one output terminal, and further including electrical normalization means by which the variation in emission responsivity among said light emitting diodes as well as the transmission variation in said optical means is automatically compensated to produce recorded data of uniform quality.

25. The apparatus of claim 23 wherein said light emitting diode is capable of responding to said enable pulses at frequencies greater than one megahertz, whereby the information conveyed by the coded data groups may be recorded on the photosensitive material at very fast rates.

26. The apparatus of claim 23 wherein said optical means further comprise reducing optical means for transferring light generated by said light emitting diode to a region on the photosensitive material having dimensions of any size desired, typically smaller than 25 micrometers in dimension, whereby the coded data groups may be recorded compactly on the film.

27. The apparatus of claim 23 wherein said optical means further comprise a coherent fiber optics bundle.

28. The apparatus of claim 23 wherein said optical means further comprise a bundle of tapered fiber optics.

29. The apparatus of claim 23 wherein said optical means further comprise an incoherent fiber optics bundle of known distortion, whereby the light generated by the light emitting diode is transferred to predetermined coded regions.

30. The apparatus of claim 23 wherein said demultiplexing means directs successive enabling pulses to the output terminals of said demultiplexing means in a cyclical sequence.

31. The apparatus of claim 23 wherein said demultiplexing means include means for directing successive enabling pulses to the output terminals of said demultiplexing means in a pseudo-random sequence, whereby the data groups are encoded spatially.

32. Apparatus for printing as predetermined shades on a photosensitive material the information conveyed by successive incoming code data groups each accompanied by an address, comprising:
   a. means for sensing the arrival of a complete incoming coded data group and for generating as an output a timing signal in response thereto,
   b. enabling pulse generating means for generating a set of enabling pulses at separate output terminals initiated simultaneously in response to the timing signal, the durations of the enabling pulses of the set representing all possible incoming data group configurations, whereby for each possible configuration of incoming coded data group there corresponds an output terminal at which an enabling pulse is presented, whose duration corresponds to the data group,
   c. multiplexing means for connecting that output terminal of said enabling pulse generating means which corresponds to a particular coded data group configuration to the output terminal of said multiplexing means.
   d. demultiplexing means connected to the output terminal of said multiplexing means and having at least one output terminal, for sensing and for routing each successive enabling pulse selected by said multiplexing means to one of the output terminals of said demultiplexing means as determined by the address accompanying the corresponding data group,
   e. at least one light emitting diode connected to each output terminal of said demultiplexing means for generating light in relation to the durations of successive enabling pulses, and,
   f. optical means for transferring the light generated by the light emitting diode to the photosensitive material.

33. The apparatus of claim 32 wherein said demultiplexing means has more than one output terminal, and further including electrical normalization means by which the variation in emission responsivity among said light emitting diodes as well as the transmission variation in said optical means is automatically compensated to produce recorded data of uniform quality.

34. The apparatus of claim 32 wherein said light emitting diode is capable of responding to said enable pulses at frequencies greater than one megahertz, whereby the information conveyed by the coded data groups may be recorded on the photosensitive material at very fast rates.

35. The apparatus of claim 32 wherein said optical means further comprise reducing optical means for transferring light generated by said light emitting diode to a region on the photosensitive material having dimensions of any size desired, typically smaller than 25 micrometers in dimension, whereby the coded data groups may be recorded compactly on the film.

36. The apparatus of claim 32 wherein said optical means further comprise a coherent fiber optics bundle.

37. The apparatus of claim 32 wherein said optical means further comprise a bundle of tapered fiber optics.

38. The apparatus of claim 32 wherein said optical means further comprise an incoherent fiber optics bundle of known distortion, whereby the light generated by the light emitting diode is transferred to predetermined coded regions.

39. A method for printing as predetermined shades on a photosensitive material the information conveyed by successive incoming coded data groups of various configurations, comprising the steps of:
   a. sensing the configuration of each successive incoming data group,
   b. generating an enabling pulse in response to the sensed configuration of each incoming data group, the duration of the enabling pulse bearing some predetermined relationship to the configuration of the incoming coded data group,
   c. directing each successively generated enabling pulse to a light emitting diode of a set of such diodes the choice of diode based on a predetermined sequence, whereby light is generated in relation to the duration of the enabling pulse,
   d. transforming the light generated by each light emitting diode into a spot of light on a photosensitiive material.

40. The method of claim 39 wherein the transforming step further comprises the step of reducing in size the spot of light on the photosensitive material, typically to a diameter smaller than 25 micrometers, whereby the information conveyed by successive coded data groups may be recorded compactly on the photosensitive material.

41. The method of claim 39 wherein the transforming step further comprises the step of forming each spot of light at a predetermined coded region of the photosensitive material.

42. A method for printing as predetermined shades on a photosensitive material the information conveyed by successive incoming coded data groups of various configurations, each group accompanied by an address, comprising the steps of:
   a. sensing the configuration and the address of each successive incoming data group,
   b. generating an enabling pulse in response to the sense configuration of each incoming, data group, the duration of the enabling pulse bearing some predetermined relationship to the configuration of the incoming data group,
   c. directing each successively generated enabling pulse to a light emitting diode, of a set of such diodes, determined by the address accompanying the data group, whereby light is generated in relation to the duration of the enabling pulse, and,
   d. transporting the light generated by each light emitting diode into a spot of light on a photosensitive material.

43. The method of claim 42 wherein the transforming step further comprises the step of reducing in size the spot of light on the photosensitive material, typically to a diameter smaller than 25 micrometers, whereby the information conveyed by successive code data groups may be recorded compactly on the photosensitive material.

44. The method of claim 42 wherein the transforming step further comprises the step of forming each spot of light at a predetermined coded region of the photosensitive material.

45. A method for printing as predetermined shades on a photosensitive material the information conveyed by successive incoming coded data groups of various configurations, comprising the steps of:

a. sensing the arrival of each complete data group and initiating a timing signal in response thereto,
b. sensing the configuration of each successive incoming data group,
c. generating a set of enabling pulses at separate output terminals, initiated simultaneously in response to the timing signal, and having durations representing all possible incoming coded data group configurations, whereby for each possible configuration having a predetermined duration,
d. selecting from the set of enabling pulses on the basis of the configuration of each incoming data group, the enabling pulse corresponding to the configuration of that incoming data group,
e. directing each successively selected enabling pulse to a light emitting diode of a set of such diodes, the choice of diode based on a predetermined sequencee, whereby light is generated in relation to the duration of the selected enabling pulse, and
f. transforming the light generated by each light emitting diode into a spot of light on a photosensitive material.

46. The method of claim 45 wherein the transforming step further comprises the step of reducing in size the spot of light on the photosensitive material, typically to a diameter smaller than 25 micrometers, whereby the information conveyed by successive coded data groups may be recorded compactly on the photosensitive material.

47. The method of claim 45 wherein the transforming step further comprises the step of forming each spot of light at a predetermined coded region of the photosensitive material.

48. A method for printing as predetermined shades on a photosensitive material the information conveyed by successive incoming coded data groups of various configurations each accompanied by an address, comprising the steps of:
a. sensing the arrival of each complete data group and initiating a timing signal in response thereto, and sensing the configuration and the address of each successive incoming data group,
b. generating a set of enabling pulses at separate output terminals, initiated simultaneously in response to the timing signal, and having durations representing all possible incoming coded data group configurations, whereby for each possible configuration of incoming coded data group there corresponds on enabling pulse having a predetermined duration,
c. selecting from the set of enabling pulses on the basis of the configuration of each incoming data group the enabling pulse corresponding to the configurations of that incoming data group,
d. directing each successively selected enabling pulse to a light emitting diode, of a set of such diodes, determined by the address accompanying the data group, whereby light is generated in relation to the duration of the selected enabling pulse, and
e. transforming the light generated by each light emitting diode into a spot of light on a photosensitive material.

49. The method of claim 48 wherein the transforming step further comprises the step of reducing in size the spot of light on the photosensitive material, typically to a diameter smaller than 25 micrometers, whereby the information conveyed by successive coded data groups may be recorded compactly on the photosensitive material.

50. The method of claim 48 wherein the transforming step further comprises the step of forming each spot of light at a predetermined coded region of the photosensitive material.

51. Apparatus for using light emitting diodes to print as predetermined shades on a photosensitive material the information conveyed by successive incoming coded data groups having various configurations, comprising:
a. pulse generating means for generating a pulse output in response to each successive incoming coded data group, the pulse having duration in some predetermined relationship to the configuration of the incoming coded data group;
b. a light emitting diode connected to said pulse generating means, disposed so as to illuminate a portion of the photosensitive material, for generating light in relation to the duration of the pulse output and;
c. electrical means connected to said light emitting diode and responsive to the predetermined emission responsivity of said diode, for normalizing its light output.

52. The apparatus of claim 51 wherein said light emitting diode is capable of responding to output pulses at frequencies greater than one megahertz, whereby the information may be recorded on the photosensitive material at very fast rate.

53. The apparatus of claim 51 wherein said enabling pulse generating means further comprises preset memory means for establishing the relationship between the duration of the enabling pulse and the configuration of the incoming coded data group.

54. The apparatus of claim 53 wherein said memory means is a nonvolatile memory.

55. The apparatus of claim 53 wherein said memory means is an alterable memory, whereby the relationship between the duration of the enabling pulse and the configuration of the incoming coded data group can be changed.

56. Method for using light emitting diodes to print as predetermined shades on a photosensitive material the information conveyed by successive incoming coded data groups having various configurations, comprising the steps of:
a. generating a driving pulse in response to each successive incoming coded data group for application to a light emittting diode, the pulse having duration in some predetermined relationship to the configuration of the incoming coded data group;
b. modifying the driving pulse in response to the predetermined emission responsivity of the light emitting diode to normalize its light output; and,
c. illuminating a portion of the photosensitive material with light generated by the light emitting diode whose operation is controlled by the modified driving pulse.

57. Apparatus for using light emitting diodes to print as predetermined shades on a photosensitive material the information conveyed by successive incoming coded data groups having various configurations, comprising:
a. pulse generating means for generating a pulse output in response to each successive incoming coded data group, the pulse having duration on some predetermined relationship to the configuration of the incoming coded data group, b. a light emitting diode connected to said pulse generated means, for generating light in relation to the duration of the pulse output, c. optical means for transferring the light generated by the light emitting diode to the photosensitive material, and d. electrical means connected to said light emitting diode and responsive to the predetermined emission responsivity of said diode, for normalizing its light output.

58. The apparatus of claim 57 wherein said light emitting diode is capable of responding to output pulses at frequencies greater than one megahertz, whereby the information may be recorded on the photosensitive material at very fast rates.

59. The apparatus of claim 57, wherein said optical means further comprise reducing optical means for transferring light generated by said light emitting diode to a region on the photosensitive material having dimensions of any size desired (typically smaller than 25 micrometers in dimension) whereby the information may be recorded compactly on the photosenstive material.

60. The apparatus of claim 57 wherein said optical means further comprises a coherent fiber optics bundle.

61. The apparatus of claim 57 wherein said optical means further comprise a bundle of tapered fiber optics.

62. The apparatus of claim 57 wherein said optical means further comprise an incoherent fiber optics bundle of known distortion, whereby the light generated by the light emitting diode is transferred to predetermined code regions of the photosensitive material.

63. The apparatus of claim 57 wherein said enabling pulse generating means further comprises preset memory means for establishing the relationship between the duration of the enabling pulse and the configuration of the incoming coded data group.

64. The apparatus of claim 63 wherein said memory means is a nonvolatile memory.

65. The apparatus of claim 63 wherein said memory means is an alterable memory, whereby the relationship between the duration of the enabling pulse and the configuration of the incoming coded data group can be changed.

66. Method for using light emitting diodes to print as predetermined shades on a photosensitive material the information conveyed by successive incoming coded data groups having various configurations, comprising the steps of:

a. generating a driving pulse in response to each successive incoming coded data group, for application to a light emitting diode, the pulse having duration in some predetermined relationship to the configuration of the incoming coded data group, b. modifying the driving pulse in response to the predetermined emission responsivity of the light emitting diode to normalize its light output, c. controlling the operation of a light emitting diode in accordance with the modified driving pulse, and, d. transferring the light emitted by the light emitting diode to the photosensitive material by the use of optical means for transferring the light emitted.

67. The method of claim 66 wherein the transferring step further comprises the step of reducing in size the spot of light formed on the photosensitive material by the means used for transferring the light emitted by the light emitting diode, whereby the information may be recorded compactly on the photosensitive material.

68. The method of claim 66 wherein the transferring step further comprises the step of transferring the light generated by the light emitting diode to predetermined coded regions of the photosensitive material.

69. Apparatus for printing as predetermined shades on a photosensitive material successive binary coded data groups of length N bits received in parallel on N conductors, comprising:

a. an exposure control circuit for generating in response to each binary coded data group a set of N timing pulses on separate conductors, said timing pulses not overlapping in time and having predetermined pulse lengths corresponding to specific digit positions in the data group.

b. at least one LED control circuit to generate an LED enable signal by combining in sequence only those timing pulses for which a predetermined binary character is present in the digit position corresponding to the timing pulse, c. at least one light emitting diode for generating light in response to the LED enable signal, and d. optical means for transferring the light generated by the light emitting diode to the photosensitive material.

70. Apparatus as described in claim 69 including more than one LED control circuit, more than one light emitting diode and further including electrical means by which the variation in emission responsivity among said light emitting diodes as well as the transmission variation in said optical means is automatically compensated to produce recorded data of uniform quality.

71. Apparatus as described in claim 69 wherein said light emitting diode is capable of responding to said enable signal at frequencies greater than 1 megahertz, whereby the binary coded data groups may be recorded on the photosensitive material at very fast rates.

72. The apparatus of claim 69 wherein said optical means further comprise reducing optical means for transferring light generated by said light emitting diode to a region on the photosensitive material having dimensions of any size desired, (typically smaller than 25 micrometers in dimension), whereby the binary coded data groups may be recorded compactly on the photosensitive material.

73. The apparatus of claim 69 wherein said optical means further comprise a coherent fiber optics bundle.

74. The apparatus of claim 69 wherein said optical means further comprise a bundle of tapered fiber optics.

75. The apparatus of claim 69 wherein said optical means further comprise an incoherent fiber optics bundle of known distortion, whereby the light generated by the light emitting diode is transferred to predetermined coded regions of the photosensitive material.

76. The apparatus described in claim 69 further comprising a sampling signal generator for sensing the presence on N conductors of successive data groups and for generating exposure-initiating signals in response thereto, and for generating successive LED address signals in response thereto, where said exposure control circuit generates a set of N timing pulses in response to each exposure-initiating signal, and where said LED control circuit is activated by the LED address signal.

77. The apparatus described in claim 76 wherein the successive LED address signals are chosen by said sampling signal generator in cyclical sequence from a group of possible signals.

78. The apparatus described in claim 76 wherein the successive LED address signals are chosen by said sampling signal generator in a pseudo-random sequence, whereby the data is encoded spatially.

79. The apparatus of claim 76 for printing as predetermined shades on a photosensitive material successive binary coded data groups of length N bits received in parallel on N conductors and accompanied by an address, in which said sampling signal generator reads the address accompanying the data group and generates an LED address signal in response thereto.

80. Method for printing as predetermined shades on a photosensitive material successive binary data groups of length N bits received in parallel on N conductors, comprising the steps of:
  a. generating in response to each binary coded data group a set of N timing pulses on separate conductors, said timing pulses not overlapping in time and having predetermined pulse lengths corresponding to specific digit positions in the data group,
  b. generating an LED enable signal by combining in sequence only those timing pulses for which a predetermined binary character is present in the digit position of the data group corresponding to the timing pulse,
  c. controlling the operation of a light emitting diode in accordance with the LED enable signal,
  d. transferring the light emitted by the light emitting diode to the photosensitive material.

81. The method of claim 80 wherein the transferring step further comprises the step of reducing in size the spot of light formed on the photosensitive material by the means used for transferring the light emitted by the light emitting diode, whereby the binary coded groups may be recorded compactly on the photosensitive material.

82. The method of claim 80 further comprising the step of:
  routing each successive binary coded data group to a successive light emitting diode control circuit in a predetermined sequence.

83. The method of claim 80 for printing as predetermined shades on a photosensitive material successive binary coded data groups of length N bits received in parallel on N conductors and accompanied by an address, further comprising the step of:
  routing each successive binary coded data group to a light emitting diode control circuit in accordance with the address accompanying the data group.

* * * * *